United States Patent
Amari et al.

(10) Patent No.: US 10,647,421 B2
(45) Date of Patent: *May 12, 2020

(54) METHOD OF FABRICATING A SPAR FOR A BLADE, A METHOD OF FABRICATING A BLADE, AND A BLADE

(71) Applicant: AIRBUS HELICOPTERS, Marignane (FR)

(72) Inventors: Andre Amari, La Chapelle en Serval (FR); Jacques Gaffiero, Paris (FR)

(73) Assignee: AIRBUS HELICOPTERS, Marignane (FR)

( * ) Notice: Subject to any disclaimer, the term of this patent is extended or adjusted under 35 U.S.C. 154(b) by 188 days.

This patent is subject to a terminal disclaimer.

(21) Appl. No.: 15/865,807

(22) Filed: Jan. 9, 2018

(65) Prior Publication Data

US 2018/0127090 A1 May 10, 2018

Related U.S. Application Data (63) Continuation of application No. 14/799,934, filed on Jul. 15, 2015, now Pat. No. 9,932,109.

(30) Foreign Application Priority Data

Jul. 18, 2014 (FR) .................................. 14 01625

(51) Int. Cl.
   *B64C 27/48* (2006.01)
   *B64C 27/473* (2006.01)
   (Continued)

(52) U.S. Cl.
   CPC ............ *B64C 27/48* (2013.01); *B29C 33/306* (2013.01); *B29C 70/345* (2013.01);
   (Continued)

(58) Field of Classification Search
   CPC ... B29D 99/0025; B64C 27/473; B64C 27/48; B64C 2027/4736; B64C 11/20;
   (Continued)

(56) References Cited

U.S. PATENT DOCUMENTS

| | | | |
|---|---|---|---|
| 3,713,753 A | 1/1973 | Brunsch | |
| 3,923,422 A | 12/1975 | Ianniello et al. | |
| 4,096,012 A * | 6/1978 | Belko | B64C 27/473 156/214 |
| 4,251,309 A * | 2/1981 | Class | B29C 70/342 156/173 |

(Continued)

FOREIGN PATENT DOCUMENTS

| | | |
|---|---|---|
| FR | 993491 A | 10/1951 |
| FR | 2030036 A1 | 10/1970 |

(Continued)

OTHER PUBLICATIONS

English Translation of JP 63-179706A.
French Search Report for French Application No. 1401625, Completed by the French Patent Office on Apr. 22, 2015, 6 Pages.

*Primary Examiner* — Moshe Wilensky
*Assistant Examiner* — Topaz L. Elliott
(74) *Attorney, Agent, or Firm* — Brooks Kushman P.C.

(57) ABSTRACT

A method of fabricating a blade spar that includes transversely at least one arrangement. A pressure-side mold and a suction-side mold are defined for each arrangement that is to be fabricated. Each mold includes at least one removable slide and a base. Each slide is then removed from a mold and the tape segments of a hank are laid by a fiber-placement method on each mold. Each mold is closed by putting the slides into place on the mold. During a finalizing step, the molds are juxtaposed and the spar is heated.

24 Claims, 4 Drawing Sheets

(51) Int. Cl.
*B29C 70/86* (2006.01)
*B29D 99/00* (2010.01)
*B29C 33/30* (2006.01)
*B29C 70/34* (2006.01)
*B29C 70/38* (2006.01)
*B29L 31/08* (2006.01)
*B29K 705/00* (2006.01)
*B29K 105/08* (2006.01)

(52) U.S. Cl.
CPC ............ *B29C 70/386* (2013.01); *B29C 70/86* (2013.01); *B29D 99/0025* (2013.01); *B64C 27/473* (2013.01); *B29K 2105/0872* (2013.01); *B29K 2705/00* (2013.01); *B29L 2031/08* (2013.01); *B29L 2031/082* (2013.01); *B64C 2027/4736* (2013.01)

(58) Field of Classification Search
CPC ........... B29L 2031/082; B29L 2031/08; F03D 1/0675; F05D 2250/75
See application file for complete search history.

(56) References Cited

U.S. PATENT DOCUMENTS

| | | | |
|---|---|---|---|
| 4,892,461 A * | 1/1990 | Matsumoto | B29C 70/345 416/134 A |
| 5,129,787 A * | 7/1992 | Violette | B29D 99/0028 416/217 |
| 5,181,829 A | 1/1993 | Pancotti | |
| 5,759,325 A * | 6/1998 | Davis | B29C 33/30 156/154 |
| 6,263,936 B1 | 7/2001 | Moore et al. | |
| 8,070,452 B2 | 12/2011 | Parisy et al. | |
| 9,932,109 B2 | 4/2018 | Amari et al. | |

FOREIGN PATENT DOCUMENTS

| | | |
|---|---|---|
| FR | 2321997 A1 | 3/1977 |
| FR | 2918347 A1 | 1/2009 |
| FR | 2993491 A1 | 1/2014 |
| JP | 63-179706 A | 7/1988 |
| WO | 99/22932 A1 | 5/1999 |

* cited by examiner

METHOD OF FABRICATING A SPAR FOR A BLADE, A METHOD OF FABRICATING A BLADE, AND A BLADE

CROSS REFERENCE TO RELATED APPLICATIONS

This application is a continuation of U.S. application Ser. No. 14/799,934, filed Jul. 15, 2015, which issued as U.S. Pat. No. 9,932,109 on Apr. 3, 2018, which claims priority to French patent application No. FR 14 01625 filed on Jul. 18, 2014, the disclosures of which are incorporated in their entirety by reference herein.

BACKGROUND OF THE INVENTION

(1) Field of the Invention

The present invention relates to a method of fabricating a spar for a blade, to a method of fabricating the blade, and the resulting blade.

(2) Description of Related Art

A rotorcraft has at least one engine that drives a main rotor in rotation in order to provide the rotorcraft with lift and possibly also propulsion. The main rotor has a hub carrying a plurality of blades.

Each blade conventionally comprises at least one spar extending spanwise from the root of the blade.

While they are rotating, the blades are subjected to a force torsor. The blades are subjected to centrifugal force and also to multiple forces and bending and twisting moments due to the movements of the blade, in particular due to its flapping movements and its lead-lag movements.

Consequently, a particular function of the spar is to transmit the forces to which the blade is subjected to the hub, and in particular to transmit centrifugal force.

A first type of blade has a spar arranged at the leading edge of the blade. The spar extends from the root of the blade along the span of the blade. That type of spar is referred to below for convenience as a "leading-edge" spar.

Such a leading-edge spar also contributes to static chord balancing of the blade.

Furthermore, the leading-edge spar tends to improve ability to withstand damage caused as a result of an object impacting against the leading edge.

A second type of blade has a spar referred to as a "distributed" spar. Such a distributed spar consists in a leading-edge spar that is extended in its running portion by two portions that are arranged flat respectively on the pressure side and on the suction side of the blade. In its running portion, a distributed spar thus has cross-sections of C-shape in transverse planes. Each transverse plane is substantially parallel to the axis of rotation of the rotor and perpendicular to the span of the blade.

The distributed spar thus has a solid leading edge. This leading edge is extended by a top flap extending over the suction side of the blade and a bottom flap extending over the pressure side of the blade.

In addition to having the advantages of a leading-edge spar, a distributed spar tends to make the blade stiffer in flapping.

Furthermore, a distributed spar tends to optimize the strength of the blade by imparting favorable strength to the blade in the event of local damage.

Nevertheless, it is difficult to connect a blade having a distributed spar to a rotor hub.

In order to be connected to a hub, the distributed spar of a blade may for example be wound at its root end around at least one vertical axis that is substantially parallel to the axis of rotation of the rotor. The blade is then fastened to the rotor by inserting a pin extending along such a vertical axis.

Nevertheless, fabricating such a distributed spar that is wound around at least one vertical pin can be difficult.

In a first step, an operator fabricates tape by impregnating resin into glass fiber roving arranged side by side and calendared to have the dimensions of the desired tape. The tape is assembled with a separator film and then wound on a reel or "roll".

Prior to being polymerized or consolidated, the roving tape used for fabricating blades presents very good capacity for deformation. This deformation capacity enables an operator to obtain complex variations in shape by smoothing manually.

In a second step, the operator builds individual hanks from segments of a roving tape. Each hank then presents a plurality of layers of roving type.

Each individual hank is in the form of a long loop closely wound around a root wedge, the hank having sections that are substantially rectangular. Each hank has a C-shape in a plane that is substantially orthogonal to the axis of rotation of the rotor. Thus, each hank has two lateral strands connected to an end wall juxtaposed against the root wedge. Such a root wedge is an elongate part made of composite materials that is for receiving a fastener bushing.

In a third step, the operator drapes a skin over a first half-shell of a mold in order to embody the pressure side of the blade, and over a second half-shell of the mold in order to embody the suction side of the blade.

The hanks are then placed in the half-shells in order to be smoothed. The root end walls of the hanks are left practically untouched by the operator. In contrast, the two hanks of each strand are handled by the operator so as to be arranged in pre-established positions along the span of the blade.

Finally, the hanks are worked manually during a smoothing operation in order to cause the material to deform and to present predefined variations in section.

At identified reference positions along the blades, operators make use of templates that embody the sections to be given to the spar so as to ensure that the strands of the hanks are deformed progressively and as regularly as possible.

Performing the third step is found to be difficult.

The shapes of the spar are relatively simple at the fastener bushing and in the running portion of the blade. In simplified manner, the hanks extend substantially vertically in the vicinity of the fastener bushing and substantially horizontally at the pressure side and the suction side. In contrast, the path followed by each hank between those two end zones is complex. This path in particular is twisted in a complex zone referred to as the "connection" zone.

Furthermore, it is not easy to lay the hank fibers coming from the twisted section of the distributed spar so that they are flat on the suction side and the pressure side of the blade.

The twisting in the connection zone can then lead to shapes being poorly reproducible, and also to the mechanical and vibratory characteristics being poorly reproducible from one blade to another.

Furthermore, if filler elements need to be arranged in the blade, then the filler elements need to be complex in shape and to vary from one blade to another when the twisting of the spar is not reproduced identically. Blade fabrication can then be difficult to automate.

Document FR 2 918 347 proposes a fastener bushing enabling the distributed spar to be wound not around a vertical axis but rather around a horizontal axis.

Documents FR 2 321 997, FR 2 030 036, EP 1 035 963, and FR 993 491 are remote from the problems of the invention.

Document FR 2 321 997 discloses a method of fabricating articles of non-circular section by winding continuous filaments.

That method makes use of a stationary mandrel that is inflatable. The mandrel is inflated in order to become circular in shape and is then set into rotation. Continuous filaments are then wound around the mandrel and coated in a curable resin.

The mandrel is then deflated to transform the winding into a deformable sheath.

The deformable sheath is then placed in the cavity of a mold. Thereafter an operator raises the pressure inside the sheath in order to cause the winding to fit closely to the shape of the mold. Finally, the operator causes the resin to cure in order to transform the sheath into a rigid hollow structure.

That method of winding continuous fibers around a stationary mandrel does not appear to be suitable for a distributed spar for a blade.

According to Document FR 2 030 036, an operator performs winding to make a cylindrical element that is to constitute the outer skin of the blade. The cylindrical element is then subdivided into two subassemblies, each of which is placed in a mold.

The spar of the blade is also made by winding.

The spar has a first block of fiber layers presenting an angle of 45° with the longitudinal axis of the blade, and then a second block of fiber layers presenting an angle of 30° with the longitudinal axis, and finally a third block of fiber layers presenting an angle of 15° with the longitudinal axis.

The spar projects to the outside at the blade root through an opening, and a wound attachment is wedged in the opening. Thereafter, the spar is inserted between the two molds in which the two subassemblies of the outer skin of the blade are arranged.

That fabrication method is effective but appears to be difficult to adapt to a distributed spar. Furthermore, multiple steps need to be performed.

Document EP 1 035 963 describes a control system for a fiber-placement device. That document EP 1 035 963 nevertheless does not give any teaching about a spar for a blade.

The fiber-placement method is an alternative to winding a continuous filament.

Fiber placement is a method of laying fibers, tapes, roving, or other similar reinforcement, while dry or when pre-impregnated with resin, on surfaces of various shapes. The placement is performed by using a device having a movable placement head. The placement head thus ensures that the material used is positioned on a surface by making direct mechanical contact with the surface. For this purpose, the placement head is moved by a movement system of the type comprising a robot or a positioning gantry, with degrees of freedom in movement that are servo-controlled depending on the shape of the surface to be covered.

The fiber-placement method thus makes it possible in particular to make surfaces of large dimensions and small thicknesses, within the limits set by the size of the placement head.

In particular, the fiber-placement method makes it possible automatically to perform operations of laying discontinuous fibers by performing starting, laying, and cutting operations.

Document FR 2 993 491 describes a fiber-placement machine.

It should be observed that placing a roving tape by means of a placement system can be difficult. The material in the form of tapes as laid by placement systems tends to be viscous. That method then provides little latitude to an operator for smoothing the tape, and that can appear to be incompatible with making a spar.

Furthermore, the size of the volumes swept by a placement head would not appear to be compatible with the volumes of the half-shells used when fabricating a blade using the above-described method.

Finally, a spar presents large thicknesses, unlike the parts that are generally fabricated by fiber placement.

In addition, a spar presents sections in its span direction that are of a very great variety of kinds. Under such circumstances, fabricating a spar by applying a fiber-placement method would appear to be difficult to perform.

Document U.S. Pat. No. 6,263,936 is also known.

BRIEF SUMMARY OF THE INVENTION

An object of the invention is thus to provide a method of fabricating a spar for a blade by fabricating a distributed spar of a blade with the help of a composite material.

The invention thus provides a method of fabricating a spar of a blade from tapes of composite materials, the spar comprising transversely at least one arrangement, each arrangement being for winding around a root axis.

An arrangement is thus a subassembly of the spar that is wound around a root axis, and consequently around a fastener bushing that extends along the root axis.

Under such circumstances, during a preparation step, a pressure-side mold and a suction-side mold are defined for each arrangement that is to be fabricated, each mold comprising a base extending longitudinally in the span direction of the spar and defining a laying surface that includes:
  a root zone having a C-shaped root wall that surrounds a root axis, the root wall forming an end wall extended by two flanks;
  a connection zone presenting two sloping connection walls forming an upside-down V-shape and connected respectively to the two flanks; and
  a running zone presenting two running walls respectively extending the two connection walls.

During a fabrication step, for each arrangement being subdivided into a pressure-side subassembly and a suction-side subassembly, each subassembly having a respective hank, each hank comprising a plurality of U-shaped tape segments stacked on one another, each mold having at least one "lateral" removable slide defining the mold transversely by extending vertically from the base, and/or at least one "longitudinal" removable slide defining the mold longitudinally by extending vertically from the base, the following actions are performed:
  removing each slide from each mold;
  fabricating the pressure-side subassembly and the suction-side subassembly of an arrangement respectively on the pressure-side mold and on the suction-side mold corresponding to the arrangement, each subassembly being fabricated by stacking tape segments on the corresponding mold by a method of placing fibers with the help of a placement head, the placement head laying said segment on the laying surface of said mold; and closing each mold by putting each slide of the mold into place, and juxtaposing said molds in order to form a closed enclosure in which the subassemblies are to be found.

Finally, in a finalizing step, the spar is heated within said molds.

This method thus seeks to define two molds for each type of arrangement. Thus, the method uses a pressure-side mold to make a hank of the arrangement to be arranged at the pressure side of the blade, and a suction-side mold to make a hank of the arrangement to be arranged at the suction side of the blade.

Each mold has a base defining a laying surface.

The base may be machined so as to have a laying surface that serves to impart the desired shape to the arrangement. Nevertheless, for this purpose the mold may have a base that is relatively plane with a core resting on the base. The core may then extend longitudinally along the base, in full or in part.

In order to facilitate laying a tape, the laying surface presents a connection zone having a special shape.

Thus, the connection walls define a V-shape, which V-shape is said to be "upside-down" when the point of the V-shape points away from the base. The V-shape may be truncated, in which case the point of the V-shape is not embodied.

Under such circumstances, the connection walls of the molds of an arrangement give each arrangement a section that is substantially X-shaped.

In addition, in order to enable a tape to be laid on a mold, each mold includes at least one slide. Each slide may be referred to as a "clearance" slide insofar as it leaves room for a fiber-placement head to pass when the slide is absent.

Each slide thus defines a mold, either longitudinally in a direction going from the root of the spar having fastener bushings towards its free end, or else transversely in a direction going from the leading edge of the blade that is to be fabricated towards its trailing edge.

Thus, during the fabrication step, the slides of the molds are separated from the bases of the molds.

Under such circumstances, each subassembly of an arrangement is fabricated in succession on its mold.

The placement head thus stacks a succession of tape segments on each mold.

In one variant, the root axis is a vertical axis substantially orthogonal to a plane in which the spar extends spanwise. The root zone is then provided with a root wall that is C-shaped, surrounding the root axis, the root wall forming an end wall that is extended by two vertical flanks that are spaced apart transversely. During fabrication of a subassembly, the placement head then winds each tape segment of the subassembly around a root axis by laying the segment on the laying surface of said mold. Each segment is wound around a vertical axis so as to present a U-shape.

In addition, the V-shape may become flattened on going away from the root zone.

Independently of the variant, each mold thus clearly defines the paths that can be followed by a fiber-placement head in order to obtain a spar presenting a variety of sections.

Once the tape segments of a hank have been deposited, an operator closes the mold by securing the appropriate slides to each base.

Thereafter, the operator secures the molds to one another and then heats the spar as a whole. Thus, if the tape segments include a thermosetting resin, the spar is polymerized on being heated. If the tape segments include a thermoplastic resin, then the spar is consolidated on being heated.

Under such circumstances, it becomes possible to lay tape segments with the help of a placement head mounted on a robot arm.

The arm can be moved in translation along a longitudinal bench parallel to a direction in which a mold extends longitudinally. Furthermore, the fiber-placement head can also be titled relative to the arm in order to go around the root zone. Thus, the fiber-placement head presents at least six degrees of freedom, thereby making it possible depending of the variant to lay each tape segment along a U-shaped path.

Furthermore, the tape segments are pressed permanently against the base, thereby making it easier to lay these segments. In addition, the path followed by these segments continues to be accessible to the fiber-placement head, in particular in the root zone, so long as the slides are removed.

The tape segments can thus be laid in full and automatically on a mold, outside the overall mold for a blade, in contrast to certain present manual methods.

Consequently, the spars obtained by this method can be substantially identical to one another.

In addition, this method avoids a difficult stage of transferring hanks between a laying zone and a molding zone. Each hank is made directly in a portion of the mold that is used for polymerizing or consolidating the spar.

The same tooling is used during the initial stage of supporting fiber placement, and then subsequently in the finalization stage of polymerizing or consolidating the spar, depending on the nature of the resins used.

This method also presents the advantage of making it possible to fabricate a spar that is solid along its leading edge, i.e. a spar presenting considerable thickness. Nevertheless, the fiber-placement method used does not appear to be suitable for such fabrication.

As explained below, the molds of an arrangement make it possible to obtain hanks that are suitable for leading to a solid leading edge.

Furthermore, this method makes it possible in particular to fabricate a distributed spar that is hollow in its running portion.

In addition, this method also makes it possible to make a spar that is wound around two vertical pins, in the variant having a vertical root axis, which used to appear to be incompatible with finding a path for a fiber-placement head.

The method makes it possible to make a first arrangement using two molds and a second arrangement using two other molds. The four molds are then juxtaposed to one another prior to polymerizing or consolidating the arrangement.

The tape segments are then laid in four passes performed respectively on four different molds.

The method may also include one or more of the following characteristics.

In an implementation, at least one mold has a removable core resting on a seat of said mold in order to embody at least part of the base of the mold.

By way of example, the core then constitutes tooling that is removed after polymerization or consolidation of the spar.

Alternatively, at least one mold has a base provided with a seat and a non-removable core of the spar, the non-removable core being constituted by a fastener bushing a root wedge surrounding the fastener bushing and filler material of the spar.

At least a portion of the laying surface of the mold is embodied by real individual parts that are to form portions of the blade. By way of example, these individual parts include a complete fastener bushing, a root wedge that extends the bushing, and a "lightweight" filler material that extends spanwise from the root wedge. Such a filler material may be a foam of polyurethane type, for example.

In this variant, an operator places the individual part of the core on the mold.

The operator then causes the placement head to lay the tape segments constituting the hank that is to be fabricated.

Furthermore, the tape has reinforcing fibers and a bonding element in the form of a thermoplastic or thermosetting resin, or in the form of an adhesive resin powder. The tape may thus have fibers made of glass, and/or carbon, and/or basalt and an epoxy, phenolic, polyester, polyurethane, polyetheretherketone (PEEK), or polyetherimide (PEI) resin, or a fiber bonding element in the form of an adhesive liquid or powder or thermoplastic bonds.

Depending on the capacity of the tape to deform, an operator may possibly perform localized smoothing operations after the segments have been laid, in order to finalize the preparation of complex sections.

Furthermore, the spar may have two arrangements wound respectively around two root axes, e.g. vertical axes.

Thus, the spar has a "trailing-edge" arrangement and a "leading-edge" arrangement.

During the preparation step, a leading-edge pressure-side mold and a leading-edge suction-side mold are then defined for making the leading-edge arrangement, and a trailing-edge pressure-side mold and a trailing-edge suction-side mold are then made for making the trailing-edge arrangement.

Consequently, before the finalizing step, the leading-edge pressure-side mold is juxtaposed laterally with the trailing-edge pressure-side mold, the leading-edge suction-side mold is juxtaposed laterally with the trailing-edge suction-side mold, the trailing-edge suction-side mold is juxtaposed in elevation with the trailing-edge pressure-side mold, and the leading-edge suction-side mold is juxtaposed in elevation with the leading-edge pressure-side mold. The assembly as constituted in this way can be heated in order to perform the stage of finalizing the spar.

The spar fabrication enclosure is thus subdivided into four molds, each mold serving to fabricate one of the hanks of the spar. Thus, the leading-edge pressure-side mold, the leading-edge suction-side mold, the trailing-edge pressure-side mold, and the trailing-edge suction-side mold make it possible to form respectively a leading-edge pressure-side hank, a leading-edge suction-side hank, a trailing-edge pressure-side hank, and a trailing-edge suction-side hank.

In addition to a method of fabricating a spar, the invention provides a method of fabricating a blade. This method comprises the steps of:

fabricating a spar by applying the method as described above;
fabricating an overall mold for the blade;
arranging the spar in the overall mold; and
arranging the overall mold in heater means for finalizing the blade by heating it.

The mold for the blade is referred to as an "overall" mold in order to distinguish it from the spar mold.

Each subassembly of a spar is then made in a specific mold that is distinct from the overall mold for the blade.

The invention also provides a blade having at least one spar, and possibly a fastener bushing, the spar including an arrangement suitable for being wound around the fastener bushing, the arrangement comprising a pressure-side subassembly and a suction-side subassembly, the arrangement extending spanwise to comprise in succession a root zone at the fastener bushing, a connection zone, and then a running zone.

Each section referred to as "connection" section of said arrangement in the connection zone is X-shaped, said pressure-side subassembly having an upside-down V-shape and said suction-side subassembly having a rightway-up V-shape in said connection section.

The term "upside-down" should be considered relative to an observer looking at the spar in the span direction, the suction-side subassembly being situated above the pressure-side subassembly.

This feature makes it possible to make the blade while using the above-described fiber-placement method.

The blade may then have a leading-edge arrangement and a trailing-edge arrangement. Each arrangement may possess a connection section that is X-shaped. Nevertheless, it is possible for only one arrangement to have such a shape.

Furthermore, when said root axis is a vertical axis substantially orthogonal to a plane in which the spar extends spanwise, each "root" section of said arrangement in the root zone may comprise at least one slab extending lengthwise in elevation.

Conversely, each "running" section of said arrangement in the running zone comprises at least one slab extending transversely lengthwise.

Each slab extends lengthwise and widthwise. The "length" of a slab of a spar thus represents the largest dimension of the slab.

BRIEF DESCRIPTION OF THE SEVERAL VIEWS OF THE DRAWINGS

The invention and its advantages appear in greater detail from the context of the following description of examples given by way of illustration and with reference to the accompanying figures, in which.

DETAILED DESCRIPTION OF THE INVENTION

Elements present in more than one of the figures are given the same references in each of them.

It should be observed that some of the figures show three mutually orthogonal directions X, Y, and Z.

The first direction X is said to be longitudinal. The term "longitudinal" relates to any direction parallel to the first direction X.

The second direction Y is said to be transverse. The term "transverse" relates to any direction parallel to the second direction Y. The chord of the fabricated blade extends transversely, whereas the span of the blade extends longitudinally.

Finally, the third direction Z is said to be in elevation. The term "in elevation" relates to any direction parallel to the third direction Z.

Figure 1:
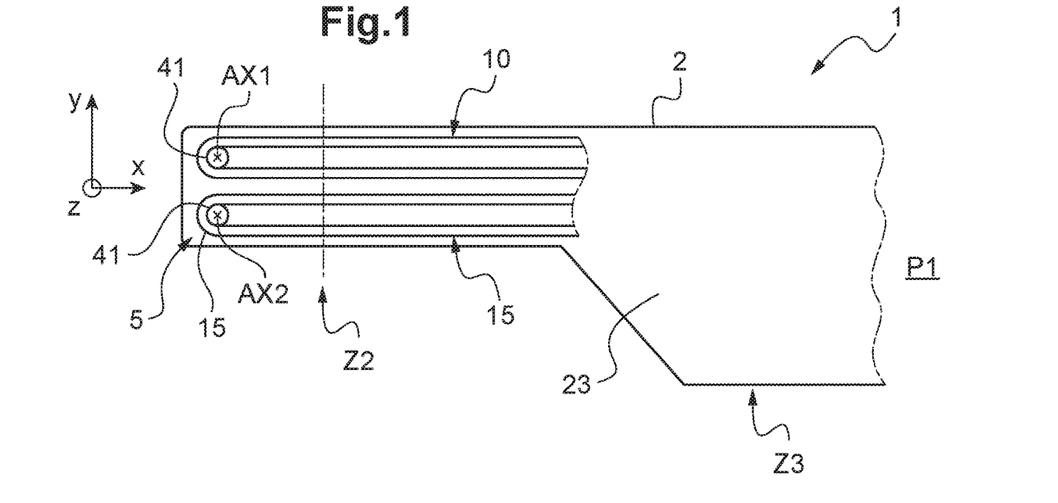
FIG. 1 is a diagrammatic plan view of a blade having a vertical root axis obtained by applying the method of the invention.

FIG. 1 shows a blade 1 fabricated by applying the method of the invention.

The blade 1 has an outer skin 2 inside which there extends a spar 5.

The spar 5 thus extends longitudinally along the span of the blade 1 in a plane P1 that extends spanwise, it extends transversely along the chords of the blade 1, and it extends in elevation along the thickness of the blade 1.

Each section of the blade 1 is thus a cross-section parallel to the second direction Y and to the third direction Z.

The spar 5 surrounds at least one fastener bushing 41. Thus, the spar 5 has one arrangement 10, 15 per fastener bushing. Each arrangement is then wound around a root axis AX1, AX2 of symmetry of a respective fastener bushing 41. In the embodiment of FIG. 1, such a root axis is a vertical axis AX1, AX2 that is substantially orthogonal to the plane P1 extending spanwise.

Figure 10:
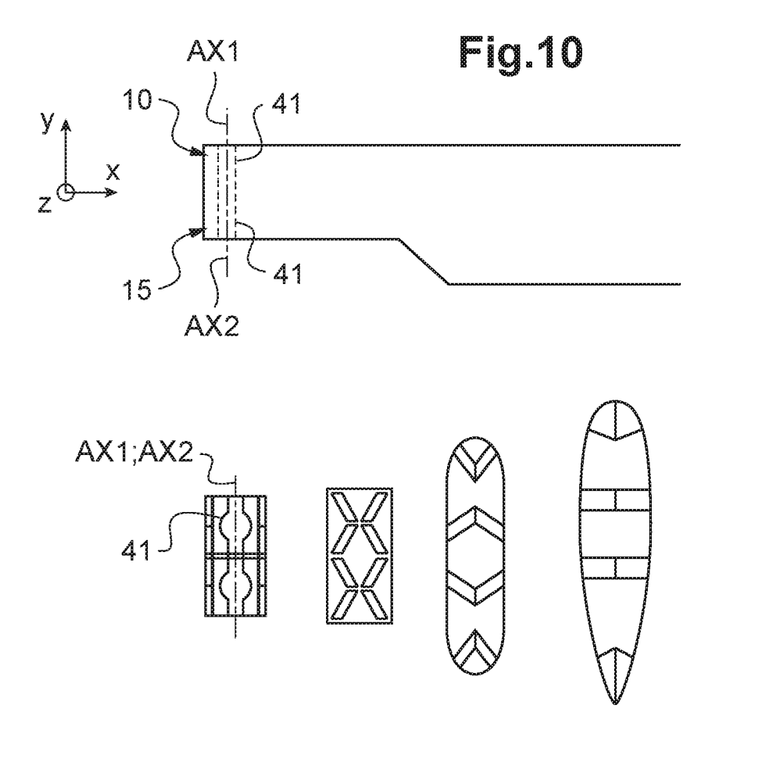
FIG. 10 is a plan view and a section view of a blade provided with a horizontal root axis obtained by applying the method of the invention.

Nevertheless, and with reference to FIG. 10, the root axis could be a horizontal axis lying substantially in the spanwise plane P1.

With reference to FIG. 1, the blade may have two fastener bushings 41. Under such circumstances, the spar 5 has one arrangement that is referred to for convenience as the "leading-edge" arrangement 10 that surrounds the fastener bushing closer to the leading edge of the blade by being wound around a first root axis AX1. The spar 5 also has a second arrangement referred to as the "trailing-edge" arrangement 15 that surrounds the fastener bushing closer to the trailing edge of the blade by being wound around a second root axis AX2.

Figure 2:
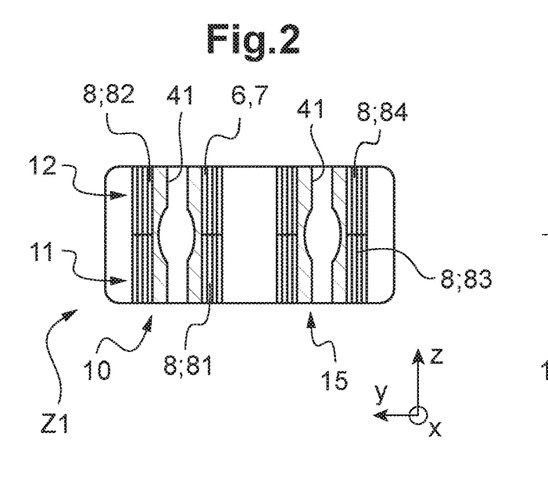
FIGS. 2 to 4 are diagrammatic cross-section views of said blade.
Figure 3:
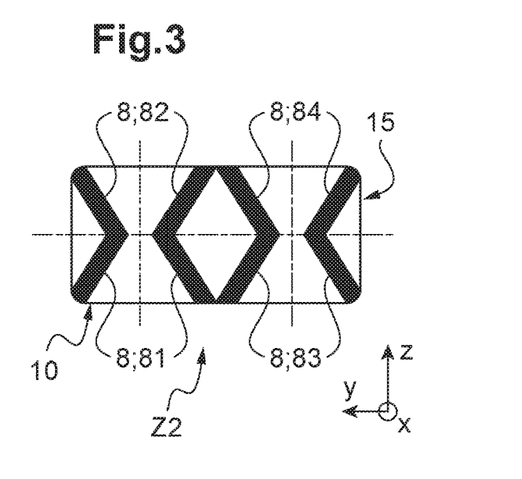
Figure 4:
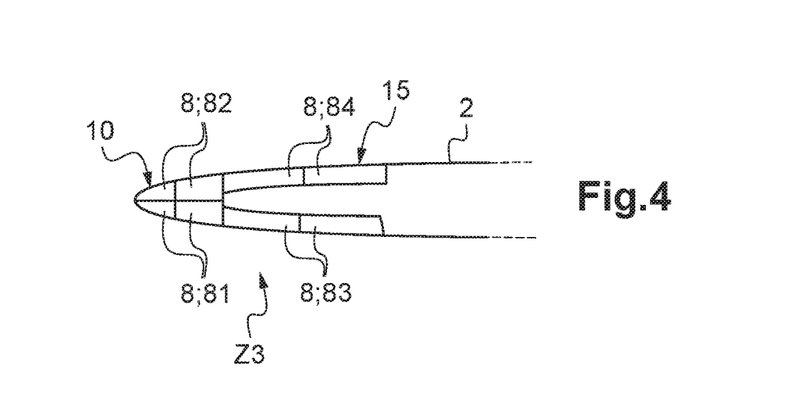

FIGS. 2 to 4 show sections of the blade respectively in a root zone Z1, a connection zone Z2, and a running zone Z3.

By way of example, each arrangement may comprise a pressure-side subassembly 11 and a suction-side subassembly 12. Each subassembly may also comprise a single hank.

Consequently, each arrangement possibly possesses a single pressure-side hank and a single suction-side hank. Under such circumstances, the leading-edge arrangement has a hank referred to as the "leading-edge pressure-side" hank 81 and a hank referred to as the "leading-edge suction-side" hank 82. Likewise, the trailing-edge arrangement comprises a "trailing-edge pressure-side" hank 83 and a "trailing-edge suction-side" hank 84.

FIGS. 1 to 4 explain a first embodiment.

With reference to FIG. 2, a section of a hank 81, 82, 83, 84 of an arrangement is substantially in the form of two rectangles in the root zone Z1. The length of each rectangle extends substantially parallel to the corresponding root axis.

Each hank comprises a stack of tape segments 6, 7. Nevertheless, FIG. 1 shows only one hank in order to avoid being pointlessly overcrowded.

In contrast, and with reference to FIG. 3, each section of an arrangement may have substantially a ⋈ shape like an hourglass in the connection zone Z2, this hourglass shape flattening on going away from the root zone.

Under such circumstances, each hank 81, 82, 83, 84 of an arrangement is substantially V-shaped in the running zone Z3. This V-shape then tends to present a point 81, 82, 83, 84 directed towards the center of the spar. In the section shown in FIG. 3, this V-shape is truncated so that it does not present the point of the V-shape.

Finally, and with reference to FIG. 4, each section of a hank 81, 82, 83, 84 of an arrangement has a substantially horizontal flat shape in the running zone Z3.

Furthermore, the leading-edge arrangement is solid, presenting a leading-edge pressure-side hank 81 juxtaposed with a leading-edge suction-side hank 82. In contrast, the trailing-edge arrangement 15 has a trailing-edge pressure-side hank 83 that is vertically spaced apart from a trailing-edge suction-side hank 84.

The section of the spar in the running zone Z3 is then C-shaped.

In the embodiment of FIG. 10, each section of a hank 81, 82, 83, 84 of an arrangement has a substantially vertical flattened shape in the running zone Z3.

Such a spar 5 and such a blade 1 can be fabricated in automatic manner by applying the method of the invention.

The method seeks to fabricate the spar from at least one tape of composite materials using a fiber-placement head.

The tape may have reinforcement in the form of fibers and a matrix in the form of resin.

Figure 5:
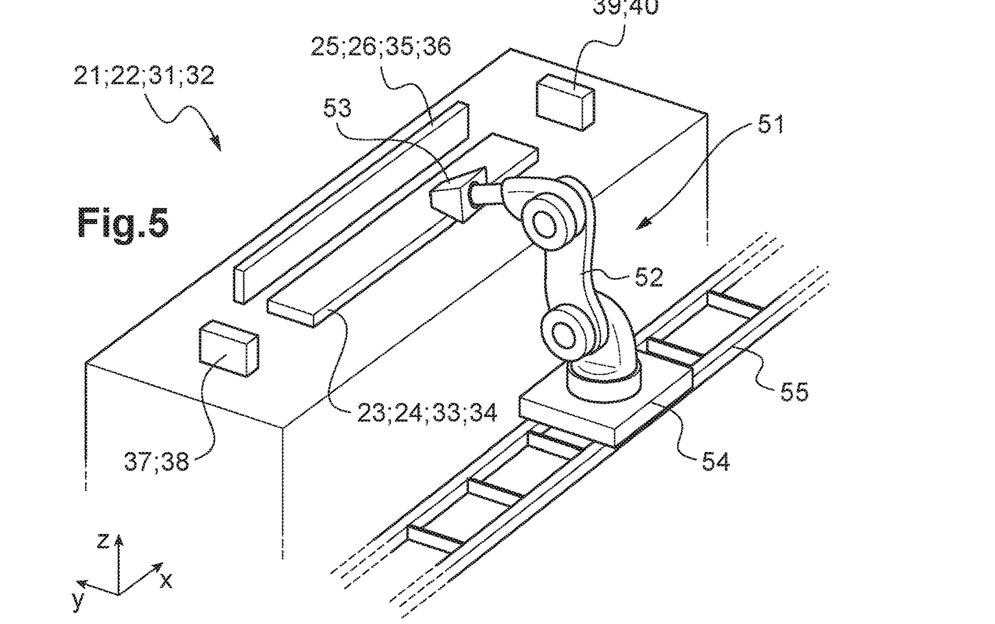
FIG. 5 is a diagrammatic view of a fiber-placement system of the invention for putting fibers into place.

With reference to FIG. 5, the method makes use of a system having a robot 51. The robot 51 has an articulated arm 52 mounted on a carriage 54 that slides on rails 55. Furthermore, the robot 51 has a fiber-placement head 53 enabling segments of a tape of composite materials to be laid on a support. Such a segment is referred to for convenience as a "tape segment".

The placement head then has at least six degrees of freedom, namely three degrees of freedom to move in translation and three degrees of freedom to move in rotation.

Furthermore, the carriage gives the fiber-placement head 53 the capacity to move several meters along an axis corresponding to the span of the blade. The fiber-placement head 53 can be used, for example, to lay a tape having a width of about 20 millimeters (mm).

The robot 51 is controlled by a controller so that the placement head lays tape along stored paths. The controller comprises a processor unit having program execution means and a memory, the program execution means executing instructions stored in the form of lines of code in the memory in order to apply the method of the invention. By way of example, the processor unit is a computer.

This system then enables a blade to be fabricated.

In the method, the spar is fabricated by performing a fiber-placement method with the help of the robot 51.

Under such circumstances, during a preparation step SPT1, a manufacturer defines one mold 21, 22, 31, 32 per hank 8.

Consequently, the manufacturer defines the shape of a pressure-side mold 22, 32 and a suction-side mold 21, 31 per arrangement 10, 15 during the preparation step.

In order to make the FIG. 1 blade, the manufacturer can then define a leading-edge pressure-side mold 22 and a leading-edge suction-side mold 21 and also a trailing-edge pressure-side mold 32 and a trailing-edge suction-side mold 31.

Each mold 21, 22, 31, 32 includes a respective base 23, 24, 33, 34, e.g. standing on a bench.

Furthermore, each mold 21, 22, 31, 32 may include at least one slide referred to as a "lateral" slide 25, 26, 35, 36. Each lateral slide defines the corresponding mold 21, 22, 31, 32 transversely by extending vertically from the base 23, 24, 33, 34. A lateral slide may extend longitudinally part of the way along the base or it may extend along the entire length of the base.

Furthermore, each mold may include at least one slide referred to as a "longitudinal" slide 37, 38, 39 and 40 that defines the mold longitudinally by extending vertically from the base.

The slides are removable so as to enable the placement head to lay segments of tape.

Figure 6:
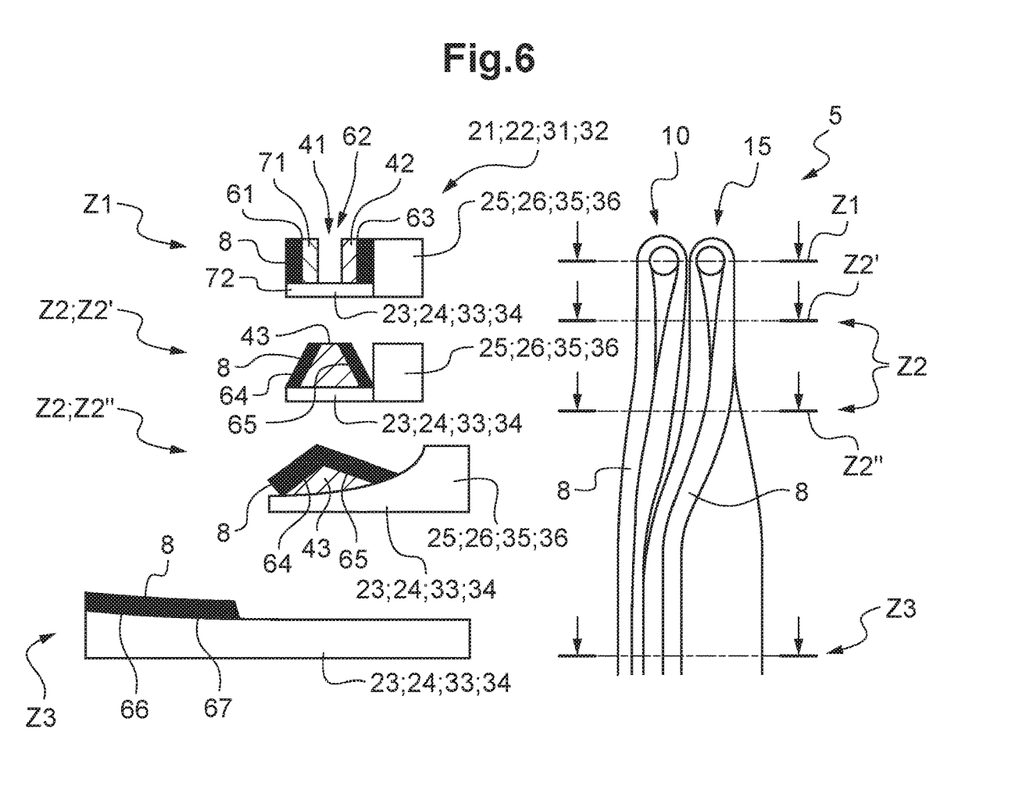
FIG. 6 is a diagram showing a spar and section views of a mold for fabricating said spar.

Under such circumstances, and with reference to FIG. 6, each mold defines a laying surface onto which segments of tape are to be stacked. FIG. 6 shows more specifically the first embodiment of FIGS. 1 to 4. Nevertheless, its teaching can be transposed to the second embodiment.

In order to facilitate representing a mold, FIG. 6 shows in its right-hand half a spar 5, and in its left-hand half four sections of a mold, and in particular of a trailing-edge pressure-side mold.

Thus, each mold presents, in the root zone Z1, a substantially vertical root wall 61 that is C-shaped.

The root wall then forms a rounded end wall 62 that is extended by two vertical flanks 63.

In the connection zone Z2, each mold presents two sloping connection walls 64, 65. The connection walls tend to form a V-shape, which may possibly be truncated, with the point of the V-shape being omitted. Each connection wall 64, 65 extends a vertical flank 63.

This V-shape flattens on going away from the root zone Z1.

Thus, in a first section Z2' close to the root zone Z1, the two connection walls are contained in planes that make a highly acute angle relative to each other. These two connection walls need not meet so as to form a truncated V-shape.

In contrast, in a second section Z2" further away from the root zone Z1, the two connection walls lie in planes that make an obtuse angle relative to each other, for example. These two connection walls may then meet so as to form a V-shape that is not truncated.

In the running zone Z3, each section presents two substantially horizontal running walls 66, 67 that respectively extend the two connection walls 64, 65. The two running walls 66, 67 may be juxtaposed transversely.

In order to embody the laying surface, the base of a mold may comprise a seat 72 carrying a core 71.

In the root zone and in the connection zone, the core presents the end wall, the root walls, and the connection walls.

In contrast, the seat may comprise the running walls, for example.

The core may be a removable core that is separated from the spar once it has been fabricated.

Conversely, the core could be non-removable and comprise elements that will constitute the blade.

Thus, the core may comprise a fastener bushing 41, a root wedge 42 surrounding the fastener bushing, and filler material 43 of the spar.

In the embodiment of FIG. 6, each mold presents a root wall in the root zone Z1.

The root wall forms two vertical flanks 61 and 63 that are juxtaposed. The flanks are arcuate in order to surround the root axis in part.

In the connection zone Z2, each mold presents two connection walls 64, 65. The connection walls tend to form a V-shape, which may possibly be truncated having the point of the V-shape omitted. Each connection wall extends a horizontal flank.

This V-shape flattens out on going away from the root zone Z1.

In the running zone Z3, each section presents two substantially horizontal running walls 66, 67 respectively extending the two connection walls. The two running walls are offset transversely.

In the method of fabrication, an operator fabricates the subassemblies of the spar one after another as follows.

In order to fabricate the hank of a subassembly, the operator removes the slides from the mold during a fabrication step.

The operator then puts the robot 51 into operation.

The absence of slides then enables the fiber-placement head to lay the tape segments on the laying surface of the mold.

The fiber-placement head 53 thus winds each tape segment of the subassembly around a root axis AX1, AX2 of the mold, laying said segment on the laying surface of the mold.

The fiber-placement head may optionally wind each tape segment of the subassembly around a vertical axis so as to describe a U-shape. The fiber-placement head then lays a segment on a first running wall, a first connection wall, the root wall, a second connection wall, and a second running wall of the mold.

Figure 7:
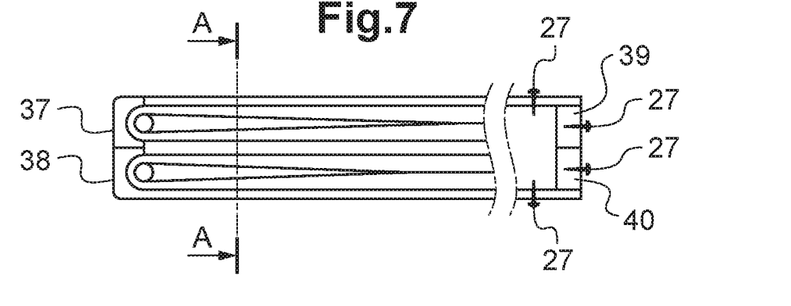
FIG. 7 is a diagram showing the slides of a mold.

At the end of this operation of laying tape segments, and with reference to FIG. 7, the operator then closes the mold by arranging the slides of the mold. For example, at least one slide is secured to a base by reversible fastener means 27, such as screw-fastener means or interfitting means, in particular.

It should be observed that, where appropriate, a slide may be common to two molds. For example, a longitudinal slide may close each of two distinct molds in part.

Optionally, internal equipment of the spar is inserted into the mold. By way of example, such internal equipment may include static and dynamic blade balancing boxes, together with dynamic matching boxes or masses and masses or counterweights for setting the center of gravity along a chord.

Figure 8:
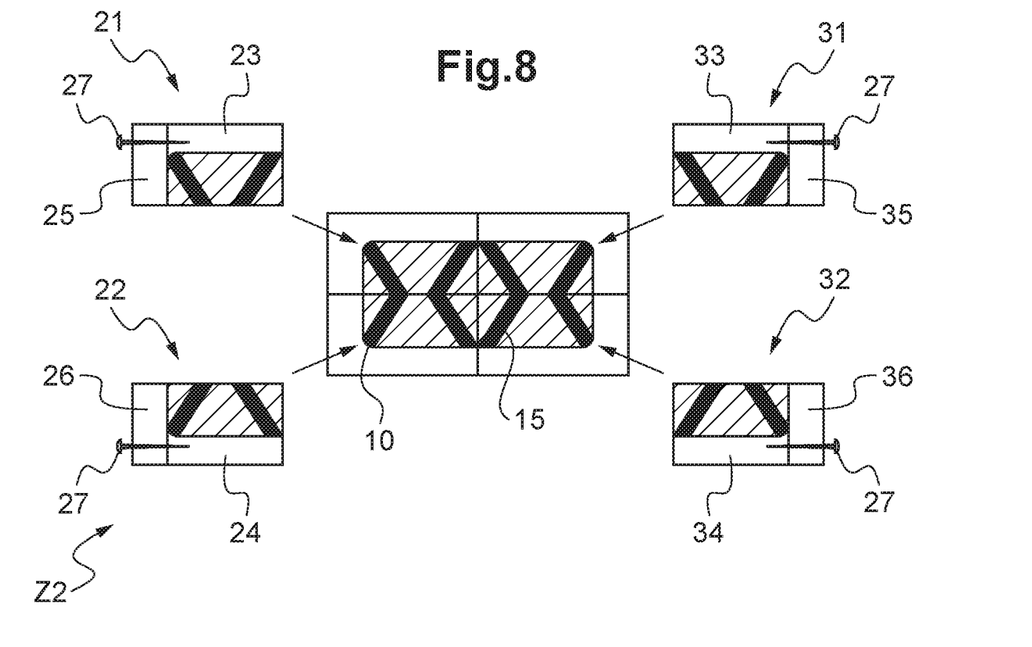
FIG. 8 is a diagram explaining the juxtapositioning of molds.

With reference to FIG. 8, the operator also assembles the molds to one another. At the end of this assembly operation, the molds form a closed enclosure in which the hanks of the spar are held.

For example, the leading edge pressure-side mold 22 is secured to the trailing-edge pressure-side mold 32. In addition, the leading-edge suction-side mold 21 is secured laterally to the trailing-edge suction-side mold 31.

In addition, the trailing-edge pressure-side mold 32 is secured in elevation to the trailing-edge suction-side mold 31, with the leading-edge suction-side mold 21 being secured in elevation to the leading-edge pressure-side mold 22.

The spar is then heated in order to be polymerized if its resin is of the thermosetting type, or to be consolidated if the resin is of the thermoplastic type.

Figure 9:
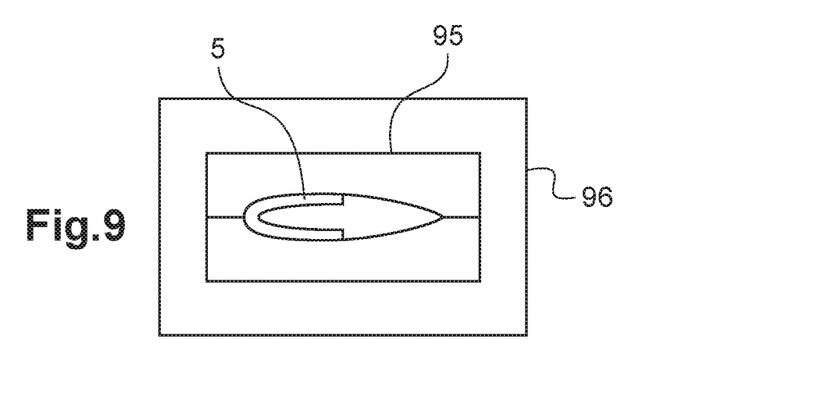
FIG. 9 is a diagram explaining the fabrication of a blade.

In order to fabricate the FIG. 1 blade, and with reference to FIG. 9, an operator also prepares an overall mold 95 of the blade to be fabricated.

The operator then places the finished spar 5 in the overall mold 95.

The overall mold 95 is then placed in heater means 96 in order to polymerize or consolidate the blade 1.

Thus, the method makes it possible to obtain a blade having at least one fastener bushing and a spar, the spar having one arrangement per fastener bushing.

As shown in FIG. 2, each section referred to as "root" section of an arrangement in the root zone Z1 may include at least one substantially rectangular slab extending in elevation along its length. In particular, the arrangement has two mutually parallel slabs arranged on either side of the fastener bushing.

As shown in FIG. 3, each section referred to as "connection" section of said arrangement in the connection zone Z2 is X-shaped. Under such circumstances, a pressure-side subassembly of the arrangement has an upside-down V-shape, while a suction-side subassembly has a rightway-up V-shape in this connection section.

Finally, and with reference to FIG. 4, each "running" section of said arrangement in the running zone Z3 comprises at least one slab extending transversely along its length.

In particular, the arrangement has two substantially horizontal slabs that are juxtaposed or offset in elevation.

Naturally, the present invention may be subjected to numerous variants as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A method of fabricating a spar of a blade from tapes of composite materials, the spar comprising transversely at least one arrangement, each arrangement suitable for being disposed about a root axis, the method comprising the following steps:
    during a preparation step, defining a pressure-side mold and a suction-side mold for each arrangement that is to be fabricated, each mold comprising a base extending longitudinally in the span direction of the spar and defining a laying surface that includes:
    a root zone having a root wall, the root wall forming two flanks;
    a connection zone presenting two sloping connection walls extending away from each other at a first angle and connected respectively to the two flanks; and
    a running zone presenting two running walls respectively extending the two connection walls;
    during a fabrication step, for each arrangement being subdivided into a pressure-side subassembly and a suction-side subassembly, each subassembly having a respective hank, each hank comprising a plurality of tape segments stacked on one another, each mold having at least one lateral removable slide defining the mold transversely by extending vertically from the base, and/or at least one longitudinal removable slide defining the mold longitudinally by extending vertically from the base:
    removing each slide from each mold;
    fabricating the pressure-side subassembly and the suction-side subassembly of an arrangement respectively on the pressure-side mold and on the suction-side mold corresponding to the arrangement, each subassembly being fabricated by stacking tape segments on the corresponding mold by a method of placing fibers with the help of a placement head, the placement head laying the segment on the laying surface of the mold; and
    closing each mold by putting each slide of the mold into place, and juxtaposing the molds in order to form a closed enclosure in which the subassemblies are to be found; and
    during a finalizing step, heating the spar within the juxtaposed molds.

2. The method according to claim 1, wherein at least one mold includes a removable core resting on a seat of the mold in order to embody the base, at least in part.

3. The method according to claim 1, wherein at least one mold has a base provided with a seat and a non-removable core of the spar, the non-removable core being constituted by a fastener bushing, a root wedge surrounding the fastener bushing and filler material of the spar.

4. The method according to claim 1, wherein, prior to juxtaposing the molds, at least one piece of internal equipment of the spar is placed in at least one mold.

5. The method according to claim 1, wherein the spar has a trailing-edge arrangement and a leading-edge arrangement, and:
    during the preparation step, a leading-edge pressure-side mold and a leading-edge suction-side mold and a trailing-edge pressure-side mold and a trailing-edge suction-side mold are defined; and
    during the finalizing step, the leading-edge pressure-side mold is juxtaposed laterally with the trailing-edge pressure-side mold, the leading-edge suction-side mold is juxtaposed laterally with the trailing-edge suction-side mold, the trailing-edge pressure-side mold is juxtaposed in elevation with the trailing-edge suction-side mold, and the leading-edge suction-side mold is juxtaposed in elevation with the leading-edge pressure-side mold.

6. The method according to claim 1, wherein the root axis is a vertical axis substantially orthogonal to a plane in which the spar extends in span, and the sloping connecting walls extend away from each other at a second angle, more than the first angle, on going away from the root zone.

7. The method according to claim 1, wherein the root axis is a vertical axis substantially orthogonal to a plane in which the spar extends in span, and during fabrication of a subassembly, the placement head winds each tape segment of the subassembly around a root axis by laying the segment on the laying surface of the mold.

8. The method according to claim 1, wherein the connection zone presenting two sloping connection walls forms a portion of an upside down V-shape.

9. The method according to claim 1, wherein the connection zone presenting two sloping connection walls forms a substantially upside down V-shape.

10. The method according to claim 1, wherein the connection zone presenting two sloping connection walls forms a truncated upside down V-shape.

11. The method according to claim 1, wherein the connection zone presenting two sloping connection walls forms an upside down V-shape.

12. The method according to claim 1, wherein tape segments are U-shaped.

13. A method of fabricating a blade, the method comprising the following steps:
    fabricating a spar by applying the method according to claim 1;
    fabricating an overall mold for the blade;
    arranging the spar in the overall mold; and
    arranging the overall mold in a heater for finalizing the blade by heating it.

14. A blade having at least one spar, each spar including an arrangement suitable for being disposed about a fastener bushing, each arrangement comprising a pressure-side subassembly and a suction-side subassembly, each arrangement extending spanwise to comprise in succession a root zone at the fastener bushing, a connection zone, and then a running zone, wherein a cross-section of each arrangement in the connection zone is substantially X-shaped, the pressure-side subassembly having a substantially upside-down V-shape and the suction-side subassembly having a substantially rightway-up V-shape in the connection zone.

15. The blade according to claim 14, wherein the fastener bushing has a root axis substantially orthogonal to a plane in which the spar extends spanwise, and each root section of the arrangement in the root zone comprises at least one rectangular slab extending lengthwise in elevation.

16. The blade according to claim 15, wherein the root axis is a vertical axis substantially orthogonal to a plane in which the spar extends spanwise, and each running section of the arrangement in the running zone comprises at least one slab extending transversely lengthwise.

17. A blade having a spar including a first arrangement suitable for being disposed about a fastener bushing, the first arrangement comprising a pressure-side subassembly and a suction-side subassembly, the first arrangement extending spanwise to comprise a root zone at the fastener bushing, a running zone, and a connection zone extending between and connecting the root zone and the running zone, the connection zone having a substantially X-shaped cross-section, the pressure-side subassembly having a shape having at least a portion of an upside-down V and the suction-side subassembly having a shape having at least a portion of a substantially rightway-up V in the connection section.

18. The blade according to claim 17, wherein the fastener bushing has a root axis substantially orthogonal to a plane in which the spar extends spanwise, and a root section of the first arrangement in the root zone comprises at least one rectangular slab extending lengthwise in elevation.

19. The blade according to claim 18, wherein the root axis is a vertical axis substantially orthogonal to a plane in which the spar extends spanwise, and each running section of the arrangement in the running zone comprises at least one slab extending transversely lengthwise.

20. The blade according to claim 17, wherein the spar includes a second arrangement suitable for being disposed about a fastener bushing, the second arrangement comprising a pressure-side subassembly and a suction-side subassembly, the second arrangement extending spanwise to comprise a root zone at the fastener bushing, a running zone, and a connection zone extending between and connecting the root zone and the running zone, the connection zone having a substantially X-shaped cross-section, the pressure-side subassembly having a shape having at least a portion of an upside-down V and the suction-side subassembly having a shape having at least a portion a substantially rightway-up V in the connection section.

21. The blade according to claim 17, wherein the connection zone presents two sloping connection walls forming a portion of an upside down V-shape.

22. The blade according to claim 17, wherein the connection zone presents two sloping connection walls forming a substantially upside down V-shape.

23. The blade according to claim 17, wherein the connection zone presents two sloping connection walls forming a truncated upside down V-shape.

24. The blade according to claim 17, wherein the connection zone presents two sloping connection walls forming an upside down V-shape.

* * * * *